(12) United States Patent
Leary et al.

(10) Patent No.: US 12,117,309 B2
(45) Date of Patent: Oct. 15, 2024

(54) SENTIMENT-BASED AUTONOMOUS VEHICLE USER INTERACTION AND ROUTING RECOMMENDATIONS

(71) Applicant: GM Cruise Holdings LLC, San Francisco, CA (US)

(72) Inventors: Jessica Leary, San Francisco, CA (US); Cecilia Ziniti, Burlingame, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 167 days.

(21) Appl. No.: 17/896,732

(22) Filed: Aug. 26, 2022

(65) Prior Publication Data

US 2022/0412766 A1 Dec. 29, 2022

Related U.S. Application Data

(63) Continuation of application No. 16/457,770, filed on Jun. 28, 2019, now Pat. No. 11,460,314.

(51) Int. Cl.

| | | |
|---|---|---|
| *G01C 21/36* | (2006.01) | |
| *B60R 11/04* | (2006.01) | |
| *G01C 21/34* | (2006.01) | |
| *G05D 1/00* | (2024.01) | |
| *G06N 5/04* | (2023.01) | |
| *G06V 20/59* | (2022.01) | |
| *G10L 15/18* | (2013.01) | |
| *G10L 15/22* | (2006.01) | |
| *H04N 23/54* | (2023.01) | |

(52) U.S. Cl.
CPC .......... *G01C 21/3679* (2013.01); *B60R 11/04* (2013.01); *G01C 21/3438* (2013.01); *G01C 21/3484* (2013.01); *G05D 1/0088* (2013.01); *G05D 1/0212* (2013.01); *G06N 5/04* (2013.01); *G06V 20/59* (2022.01); *G10L 15/1815* (2013.01); *G10L 15/22* (2013.01); *G10L 2015/223* (2013.01); *H04N 23/54* (2023.01)

(58) Field of Classification Search
CPC . G01C 21/3679; G01C 21/3484; B60R 11/04; G05D 1/0212; G10L 15/1815; G10L 2015/223; H04N 23/54
USPC .......................................................... 701/23
See application file for complete search history.

(56) References Cited

U.S. PATENT DOCUMENTS

| | | | |
|---|---|---|---|
| 10,573,184 B1 * | 2/2020 | Pandit | G08G 1/207 |
| 11,919,531 B2 * | 3/2024 | Reiley | A61B 5/165 |
| 2015/0106285 A1 * | 4/2015 | Chu | G06Q 50/14 |
| | | | 705/319 |

(Continued)

*Primary Examiner* — Krishnan Ramesh

(57) ABSTRACT

The subject disclosure relates to techniques for providing destination recommendations and improving the user experience of autonomous vehicle riders using sentiment analysis. In some aspects, a process of the disclosed technology includes steps for receiving a ride request, at a computing system of an autonomous vehicle (AV), wherein the ride request comprises trip information that specifies a pick-up location associated with a user, navigating the AV to the pick-up location to provide ride service for the user, receiving in-cabin sensor data associated with the user, and analyzing the in-cabin sensor data to determine a sentiment score associated with the user. In some aspects, the process can further include steps for generating a destination recommendation based on the trip information and the sentiment score. Systems and computer-readable media are also provided.

14 Claims, 6 Drawing Sheets

(56) References Cited

U.S. PATENT DOCUMENTS

| | | | |
|---|---|---|---|
| 2016/0089954 A1* | 3/2016 | Rojas Villanueva | ........................ B60H 1/00742 701/36 |
| 2016/0143554 A1* | 5/2016 | Lim | ..................... A61B 5/6803 600/386 |
| 2017/0030726 A1* | 2/2017 | French | ................ G01C 21/3697 |
| 2017/0109437 A1* | 4/2017 | Kudo | ....................... G06F 16/35 |
| 2017/0205240 A1* | 7/2017 | Nakamura | .......... G01C 21/3682 |
| 2017/0303842 A1* | 10/2017 | Yoshida | ................. B60W 50/14 |
| 2017/0336217 A1* | 11/2017 | Sueyoshi | ............ G01C 21/3841 |
| 2019/0232974 A1* | 8/2019 | Reiley | .................. G06V 40/168 |
| 2020/0249036 A1* | 8/2020 | Ha | ...................... G01C 21/3438 |
| 2020/0309549 A1* | 10/2020 | Aizawa | .............. G01C 21/3484 |
| 2020/0310528 A1* | 10/2020 | Upmanue | ............. A61B 5/4803 |
| 2020/0349666 A1* | 11/2020 | Hodge | ................ G01C 21/3602 |
| 2020/0363220 A1* | 11/2020 | Simoudis | ............ G06Q 30/0255 |
| 2020/0410019 A1* | 12/2020 | Lenke | ................. G06F 16/9537 |
| 2021/0043086 A1* | 2/2021 | Chen | ........................ G06N 5/01 |
| 2021/0064616 A1* | 3/2021 | Hu | .......................... G06N 20/00 |
| 2021/0199455 A1* | 7/2021 | Duffy | ................. G06Q 30/0269 |

* cited by examiner

SENTIMENT-BASED AUTONOMOUS VEHICLE USER INTERACTION AND ROUTING RECOMMENDATIONS

CROSS-REFERENCE TO RELATED APPLICATIONS

This application is a continuation and claims the benefit of U.S. application Ser. No. 16/457,770, filed on Jun. 28, 2019, entitled SENTIMENT-BASED AUTONOMOUS VEHICLE USER INTERACTION AND ROUTING RECOMMENDATIONS, which is expressly incorporated by reference herein in its entirety.

BACKGROUND

1. Technical Field

The subject technology provides solutions for improving a user experience in relation to the use of an autonomous vehicle (AV) driving service and in particular, for improving AV-to-user interactions by providing customized recommendations and ride accommodations based on user sentiment analysis.

2. Introduction

Autonomous vehicles (AVs) are vehicles having computers and control systems that perform driving and navigation tasks conventionally performed by a human driver. As AV technologies continue to advance, ride-sharing services will increasingly utilize AVs to improve service safety and efficiency. For effective use in ride-sharing deployments, AVs will perform many service functions that are conventionally done by human drivers, including tasks related to ensuring a positive and possibly engaging rider experience that riders want to continue to take.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

Figure 1:
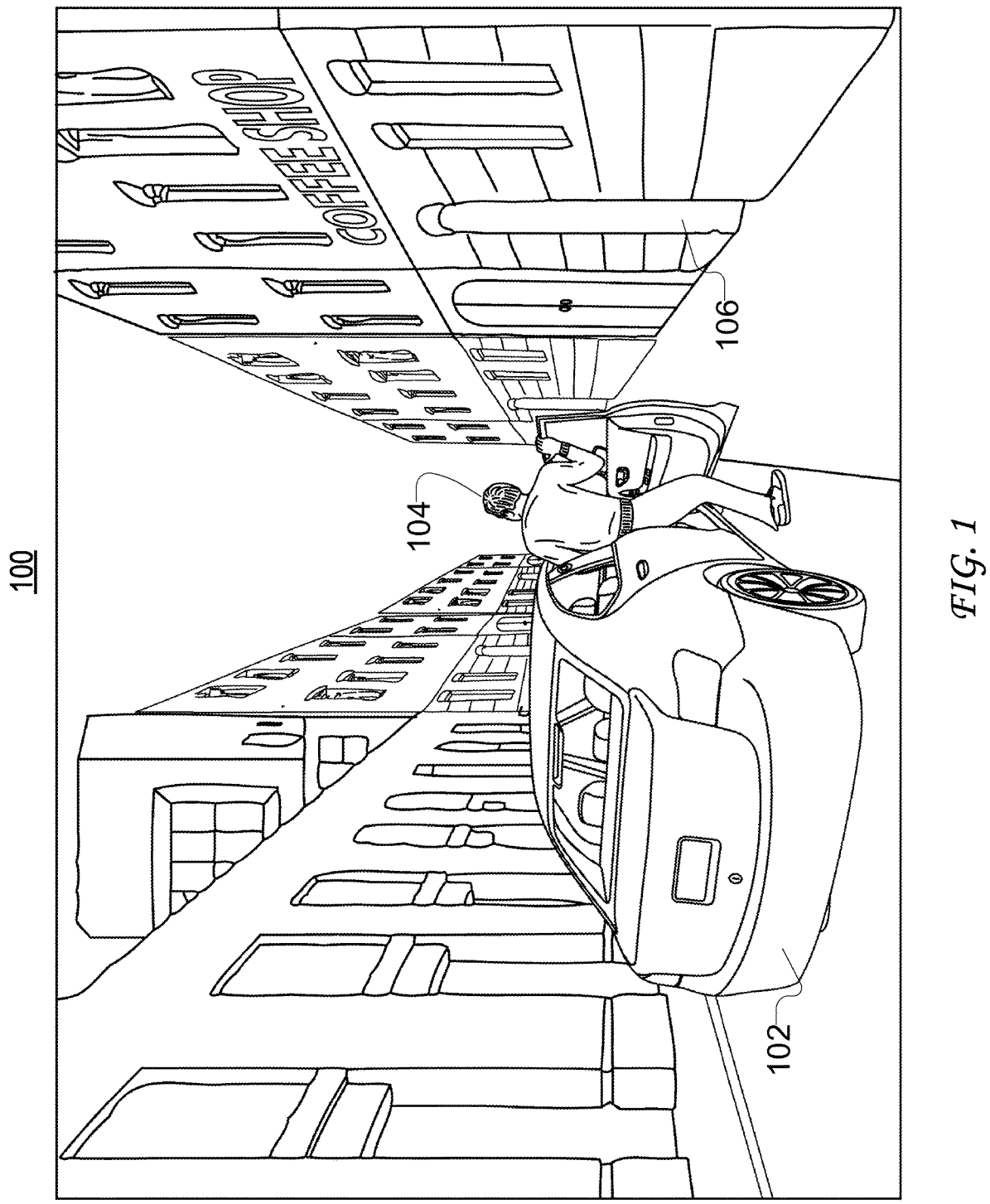
FIG. 1 illustrates an example environment in which some aspects of the disclosed technology can be implemented.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Human drivers of conventional transportation services (e.g., taxis, buses, and other rideshare services) routinely perform functions necessary to improve the rider experience, such as, making destination recommendations, and/or making adjustments to the in-cabin environment, e.g., by adjusting temperature, lighting, and/or music settings, etc. However, because human drivers often know very little about their rider (customer) such recommendations and adjustments must often be provided on the basis of direct questions or other information gleaned from the rider through conversation. Or, in some cases, human drivers do not care about the rider experience, preferring not to notice or ask about the comfort, mental state, or intent of a rider they are driving to a given destination. Additionally, conventional human drivers typically do not know their customer's historic destination inclinations and/or in-cabin preferences, and therefore cannot make destination recommendations or perform other proactive measures to improve the general rider experience. Even if they have preferences or sentiment about a ride, their destination, or other aspects of the ride the human driver of their ride could control, riders may also hesitate to interact with another human they know only in a transactional, single ride context. They may have concern for their own privacy, safety (driver distraction), not want to be impolite, or in general they may be silent because they do not have a trust relationship with that person. Or the rider may be tired and simply not want to interact with another person. A helpful human chauffeur, giving a personalized ride to his or her charge, would sense the riders moods and concerns, be familiar with the places that user goes, and generally be more helpful than a single one time ride hailing driver could be.

Aspects of the disclosed technology address the foregoing limitations of conventional ride-sharing services by providing methods and systems for making rider recommendations and accommodations automatically based on rider sentiment analysis. In some aspects, rider recommendations can include the recommendation of a way-point or drop-off location. In other aspects, user sentiment analysis can be used to drive automatic changes or adjustments to the AV's in-cabin environment, for example, by adjusting music, temperature, lighting and/or driving style, etc.

As discussed in further detail below, interactions (between the AV and the user), can be further based on user/rider profile information that includes various data regarding the user's preferences, ride history, and/or historic sentiment scores, etc. As used herein, rider profile information can encompass virtually any type of information relating to a specific user and/or the user's use or consumption of ride services and/or third-party services. By way of example, rider profile information may include demographic information, as well as user preferences, interactions, or reviews provided either to the AV service or in relation to a third-party product or service that can be used to inform interactions between the AV and the user/rider.

FIG. 1 illustrates an example environment 100 in which some aspects of the disclosed technology can be implemented. Environment 100 includes an autonomous vehicle (AV) 102 shown responding to a ride request by user 104. Depending on the desired implementation, user 104 can hail AV 102 by sending a ride request from a client device (e.g., a smart phone or other mobile computing device) to an AV dispatch system (not illustrated). The dispatch system can then provide an origin (or pick-up) location for the ride request to a computing system of AV 102, causing AV 102 to navigate to the associated origin. In some aspects, user 104 can be associated with a unique rider account that is associated with various information that is uniquely associated with the rider. By way of example, the rider account can be associated with a unique user identifier (ID) and/or a rider profile corresponding with user 104. Uniquely identifying user information e.g., the user's rider account, user ID and/or rider profile can be used to distinguish from user 104, and other users of the same ride hailing (ridesharing) service.

As discussed in further detail below, the existing rider account and/or rider profile for user 104 can be associated with historic trip information for previous rides taken by user 104. By way of example, historic trip information can include origin and destination locations for previous rides, route information for previous rides, and/or sentiment scores for the user. In some aspects, sentiment information may be geographically associated, for example, to pair inferences regarding an emotional state of user 104 with particular origin and/or destination locations in the user's ride history. As discussed in further detail below, associations between locations and user mood or sentiment can be used to inform destination recommendations provided by AV 102.

Associations between locations of user 104 and inferences about the user's mood or sentiment can be ongoing and updated with each new ride. For example, in the example of environment 100, the pick-up location is proximate to business 106 (e.g., a coffee shop) visited by user 104 prior to ride service pick-up. Based on the proximity of the pick-up location to business 106, trip information associated with user 104 can be enriched to reflect a possible association between user 104 and business 106. Before and/or upon entry to the in-cabin environment, sensor data relating to user 104 is collected and used to infer sentiments/moods of user 104 that can then be paired with the origin (or destination) location, for example, as part of a rider profile for user 104. In some aspects, sensor data may be collected by outward facing cameras, for example, that are used to facilitate the use of facial recognition for unlocking the AV to admit the rider/passenger. That is, sentiment data may be correlated with authentication data used to validate a rider/user. In some instances, sentiment inferences can also be associated with a business, such as business 106, that user 104 was known to have visited. As discussed in further detail below, locations or business establishments known to be correlated with positive user emotional responses may be used to inform AV recommendations and/or in-cabin adjustments.

Figure 2:
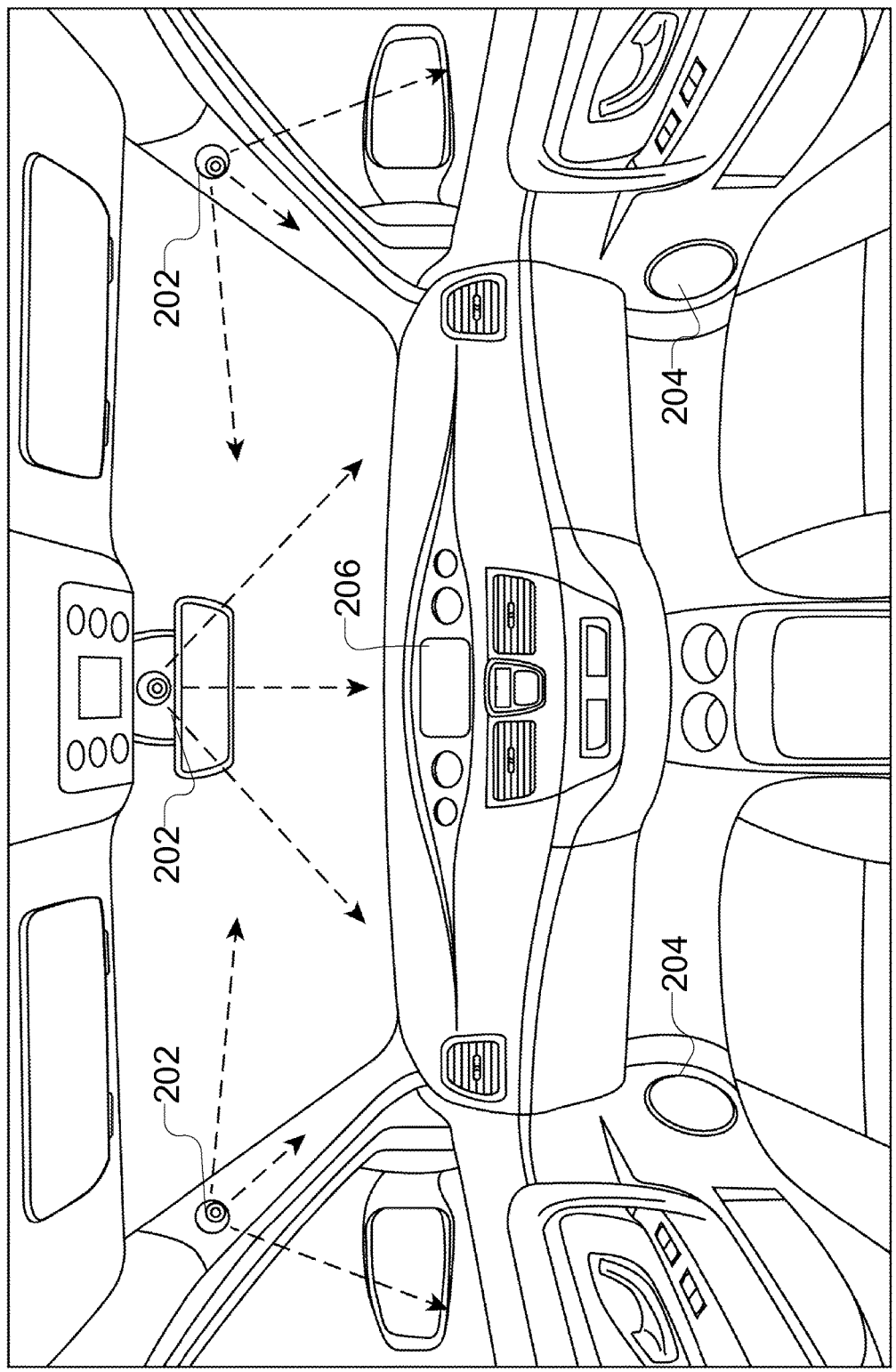
FIG. 2 illustrates an example of an in-cabin autonomous vehicle (AV) environment in which some aspects of the disclosed technology can be implemented.

FIG. 2 illustrates an example of an in-cabin autonomous vehicle (AV) environment 200 in which some aspects of the disclosed technology can be implemented. Environment 200 illustrates the interior of AV 102 experienced by user 104 after pick-up. Environment 200 includes various sensors, such as cameras/microphones 202 that enable the collection of sensor data pertaining to user 104. However, it is understood that in some aspects, sensor data may be collected from other devices, such as a biometric device worn by the user (e.g., in a watch, ring, or other wearable). By way of example, sensor data may be collected from one or more in-cabin sensors and/or one or more biometric devices worn or owned by the user/rider e.g., a wearable watch, ring, and/or clothing that contains one or more biometric sensors.

As used herein, sensor data can include any quantitative or qualitative data collected about user 104, including but not limited to: video footage, audio information, user engagement with one or more touch-screens (e.g., display 206), grip on handles in the vehicle, seat pressure sensor data, etc. Although the foregoing provide examples of devices/sensors that can be used to collect sensor data in an in-cabin environment, it is understood that a variety of other (or different) data collection devices, such as using various biometric sensors, may be implemented, without departing from the scope of the disclosed technology.

In practice, sentiment analysis can be performed on sensor data collected by cameras/microphones 202, and used to make inferences regarding emotional states of the rider/user 104. As discussed in further detail below, sensor data can be stored for later sentiment analysis processing. Alternatively, sensor data may be processed in real-time, for example, by one or more local computing systems in AV 102, and/or using one or more remote (e.g., cloud) computing systems in communication with AV 102 via a wireless communication channel.

In some aspects, sentiment analysis processing can produce one or more emotional sentiment scores, for example, that indicate a relative statistical probability of a given emotional state (emotional classification) of user 104. In some implementations, sentiment analysis scores can indicate positive or negative emotional states. That is, the sentiment score resulting from analysis of the sensor data can be used to make probabilistic determinations that user 104 is having a positive emotional experience (e.g., experiencing happiness, joy, gratitude, or amusement, etc.), or a negative emotional experience (e.g., experiencing sadness, anger, fear or anxiety, etc.). In other implementations, sentiment analysis scores may indicate quantitative scores corresponding with different specific emotional states, wherein the associated score of any state represents a weighting or likelihood of that user 104 is experiencing the corresponding emotion. It is understood that other sentiment scoring systems may be implemented, without departing from the scope of the disclosed technology.

In some approaches, the resulting sentiment score is associated with geographic information pertaining to a trip taken by user 104. For example, the sentiment score can be associated with a pick-up location, a drop-off location, or a way-point along a route between the pick-up and drop-off locations. In some aspects, multiple sentiment scores may be calculated for a user along a given trip route. For example, a sentiment score may be determined at pick-up, then re-calculated after stopping at a way-point. Finally, the sentiment score may again be recalculated based on sensor data collected at or around a time user 104 is delivered to his/her desired drop-off location.

As discussed in further detail below, sentiment scores can be used to make inferences about locations that are preferred by the user, for example, by monitoring changes in the corresponding sentiment score, or based on statistical metrics of sentiment score that are determined from the user's historic ride data. In some approaches, multiple sentiment score calculations associated with the same (or a similar) location can be compared with multiple sentiment score calculations associated with a different location. Such comparisons can be used to infer preferences of user 104 for each location. By way of example, sentiment scores indicating that the user is happy or experiencing joy may be used to infer that he/she likes a location, or enjoys an attraction (e.g., an activity or business proximate to that location). Conversely, if a given location is correlated with lower sentiment scores, indicating negative emotional affect, it may be inferred that the user dislikes something at (or around) that location. In this way, sentiment score comparisons between different locations can be used to drive user destination recommendations, e.g., by selecting destination recommendations that are likely to be enjoyed by the user.

By way of example, historic sentiment score analysis may reveal that user 104 seems to possess a highly positive emotional affect whenever leaving business 106. As such, AV 102 may suggest a location associated with business 106 to user 104, for example, as a way to improve an emotional state of user 104. In another example, AV 102 may provide location suggestions associated with positive sentiment scores when providing a pick-up to user 104 at locations known to be associated with lower sentiment scores.

In other implementations, the delivery of destination recommendations by AV 102 can be based on non-geographic factors, such as based solely on a detected emotional state of user 104. That is, AV 102 may make sentiment-based recommendations as a way to improve the emotional well-being of rider 104, for example, by making recommendations targeted to raise the user's sentiment score from a detected baseline. By way of example, if sentiment analysis of collected sensor data suggests that user 104 is sad, then AV 102 may generate a destination recommendation or other suggestion calibrated to improve the user's mood.

Adjustments to in-cabin environmental conditions, such as, cabin ambience can be performed based on current and/or historic sentiment scores for user 104. That is, automatic changes to one or more of: temperature, lighting, and/or musical selections, etc., can be performed based on inferences regarding what settings may contribute to an overall positive emotional state of the user. Additionally, other factors affecting user experience can similarly be altered, such as, a driving style of AV 102. By way of example, if a sentiment score of user 104 indicates a sad or anxious mood, then the selected driving style may be more conservative or a more scenic route may be selected. Alternatively, if a mood of user 104 is determined to be more angry or aggressive, a correspondingly aggressive driving style may be selected. When scaled over time for the same user, and/or across multiple users, such recommendations and environmental changes can significantly improve the aggregate customer experience for users engaging with a ride service.

Figure 3:
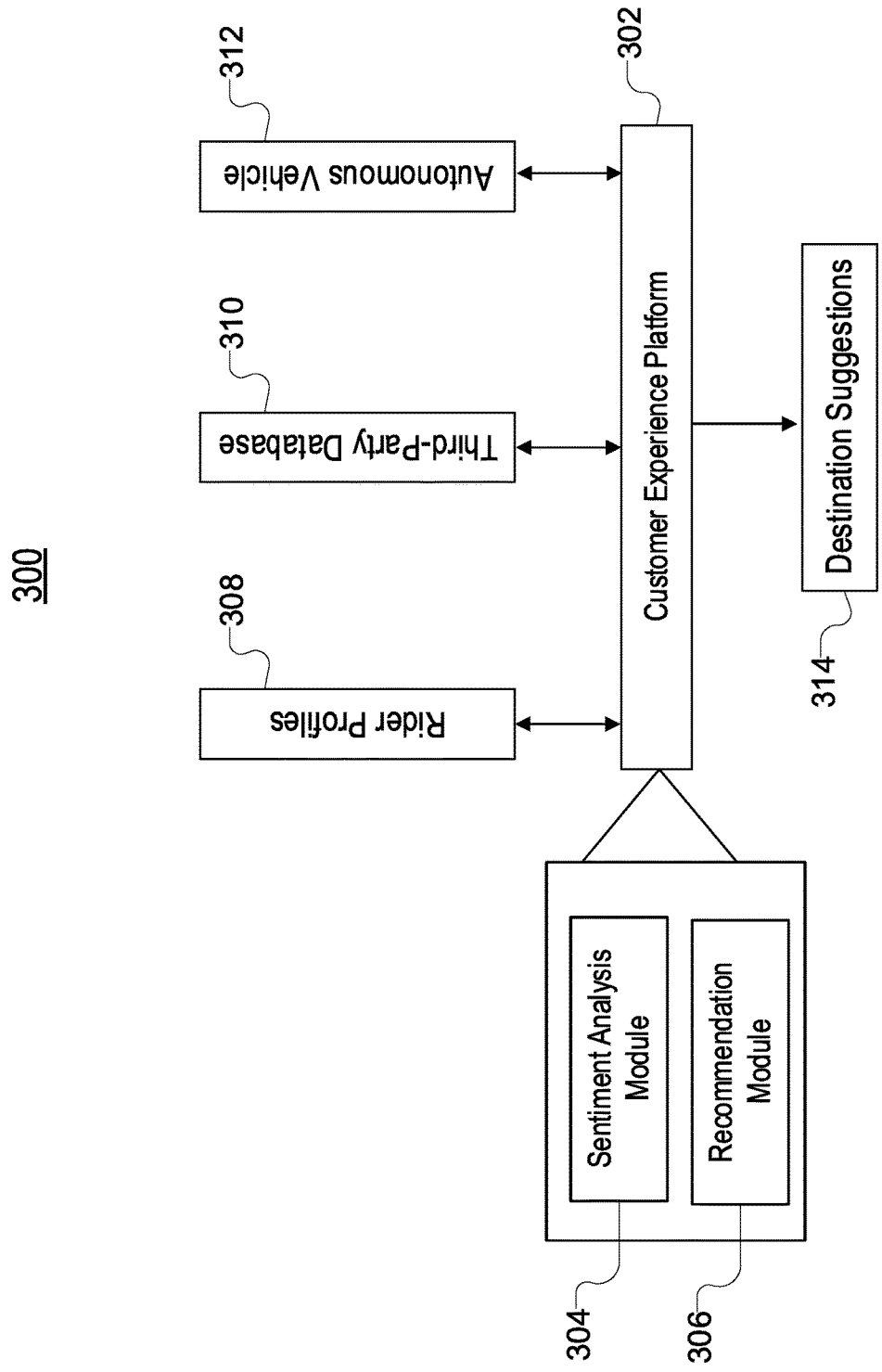
FIG. 3 illustrates an example of a rider interface and recommendation system that can be configured to provide destination recommendations and make other rider accommodating changes using sentiment analysis, according to some aspects of the disclosed technology.

FIG. 3 conceptually illustrates a recommendation and customer experience system 300 of the disclosed technology. As illustrated, system 300 can include a variety of interconnected services and systems that can include physical devices, software and/or firmware necessary to perform various functionalities described herein. System 300 includes customer experience platform 302 that is configured to generate and provide destination recommendations 314 and/or make modifications to an AV in-cabin environment, consistent with various aspects of the disclosed technology. Although system 300 is shown in simplified block form, it is understood that the system can be implemented using a variety of hardware and software systems, including distributed computing systems and/or functions instantiated as virtual entities in a cloud platform. For example, any of the functions necessary to provide ride services, dispatch, and navigation can be performed by systems distributed across one or more remote, cloud, and/or AV computing systems. Similarly, systems needed to collect sensor data, perform sentiment analysis, generate destination recommendations, and/or make in-cabin environmental adjustments can be similarly distributed. As such, various systems used to implement platform 302 can be in communication over one or more data networks, including but not limited to wired and/or wireless public or private Local Area Networks (LANs), Wide Area Networks (WANs), or a network of networks, such as the internet.

Customer experience platform 302 includes a review sentiment analysis module 304, and a recommendation module 306. Platform 302 is configured to exchange data with various databases, modules, and third-party systems. As illustrated, platform 302 is configured to exchange data with rider profile database 308, a third-party database 310, and/or AV 312. In turn, platform 302 is configured to perform data aggregation and processing necessary to generate and output destination suggestions 314.

It is understood that rider profile database 308 can represent aggregated data pertaining to one or more riders/users and that encompasses historic information pertaining to one or more trips taken by the riders using an AV service. As such, rider profile database 308 can include historic sentiment scores associated with unique user identifiers and/or geographic locations (e.g., origin, destination, and/or waypoints) for one or more trips. Third-party database 310 can represent one or more information repositories that contain data relating to one or more users. Such data can include demographic data, psychographic data, business reviews, product reviews, and/or geolocation data. Data in third-party database 310 may be received or ingested using an Application Programming Interface (API) or other software application layering, without departing from the disclosed technology. Additionally, autonomous vehicle 312 can represent a single autonomous vehicle, multiple vehicles, or an entire AV fleet, depending on the desired implementation. In some aspects, customer experience platform 302 can ingest specific types of data (e.g., sensor data) collected by sensors/systems located on one or more AV's in a fleet.

In practice, sensor data collected by one or more AV sensors can be received by platform 302, and used to perform sentiment analysis for a corresponding user. By way of example, sensor data can be provided to sentiment analysis module 304 and used to determine an emotional disposition of the associated user. In some aspects, sentiment analysis may be performed with the benefit of additional information about the user. For example, sentiment analysis calculations performed by analysis module 304 can be based on rider profile information retrieved from rider profile database 308, and/or other information known about the user, such as demographic information retrieved from third-party database 310. In some aspects, as discussed above, sentiment analysis may be performed locally (e.g. using a computing system physically resident on an AV that provides ride service to the user).

Using sentiment analysis scoring performed by analysis module 304, recommendation module 306 can generate recommendations targeted to a specific user and/or targeted based on the user's inferred emotional affect. Additionally, as discussed above, customer experience platform 302 can be used—in conjunction with sentiment analysis module 304, rider profile database 308 and/or third-party databases 310—to identify in-cabin environmental preferences or settings for a particular user. For example, experience platform can perform functionality needed to alter in-cabin ambience, such as, by changing thermostat settings, musical selections, and/or in-cabin lighting characteristics. In some aspects, experience platform 302 can also perform functionality necessary to update driving profiles, for example, to adjust an AV driving style based on historic user preferences and/or current or past emotional states of the user, as inferred from sentiment scores determined by analysis module 304.

Figure 4:
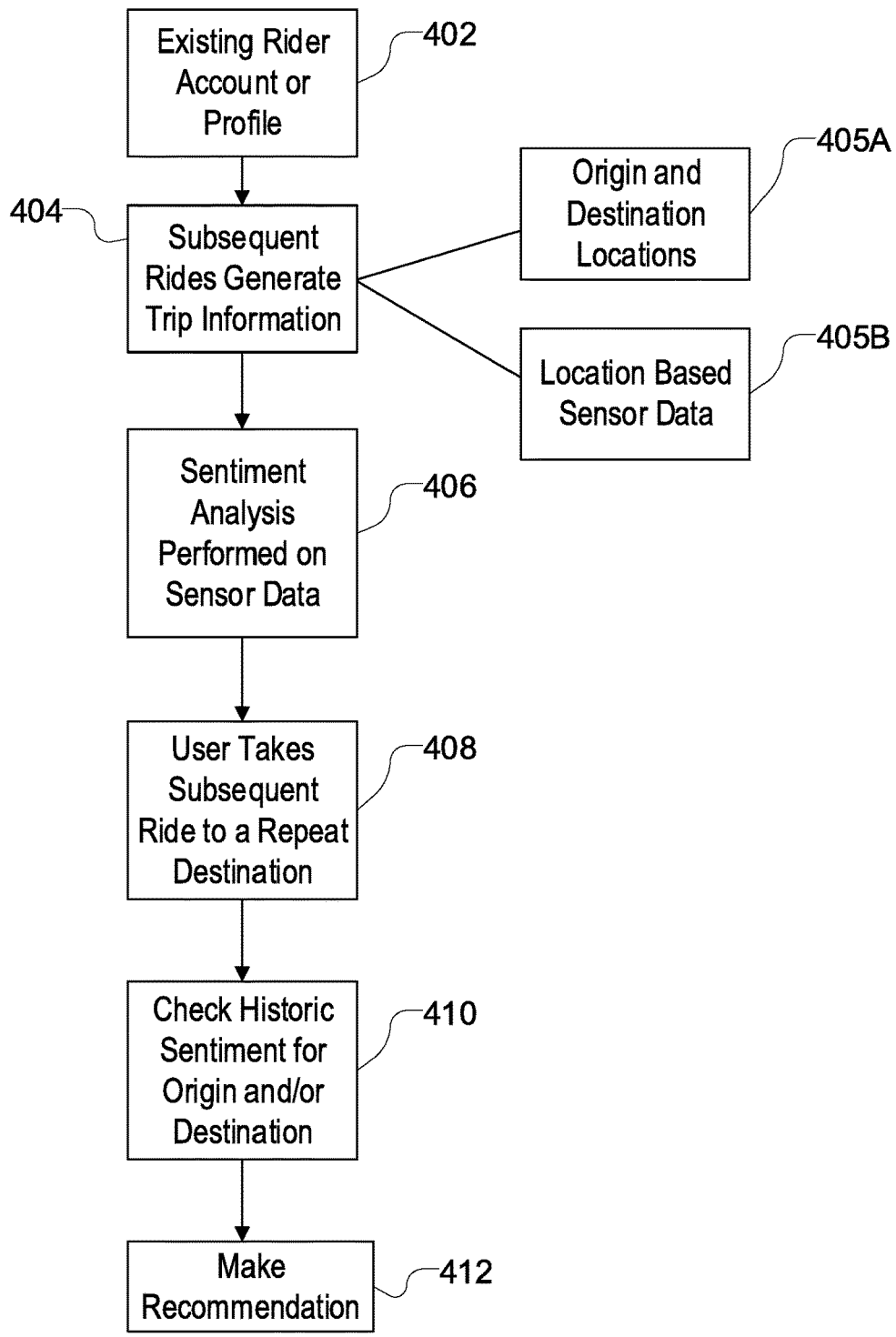
FIG. 4 schematically illustrates a process for providing AV destination recommendations, according to some aspects of the disclosed technology.

FIG. 4 schematically illustrates an example process 400 for providing AV destination recommendations, according to some aspects of the disclosed technology. Process 400 begins at block 402 in which an existing rider account and/or profile is created and maintained, e.g., by a ride sharing service, such as using system 300 discussed above with respect to FIG. 3. As discussed above, the rider account and/or rider profiles can include (or may be associated with) various types of data, including data relating to previous/historic rides taken by the user. Existing rider account and profile data is updated with each subsequent ride taken by the user, for example, that adds new trip information to the user's history (block 404).

As further indicated at block 404, trip information can include geographic information e.g., origin and/or destination locations (block 405A), as well as location-based sensor data (block 405B). As discussed above, location-based sensor data can include video data, audio data, or other forms of biometric data collected from a user/rider in the in cabin environment of an autonomous vehicle. The collected sensor data can be associated with a geographic location or vicinity where the data collection occurs, such as, at or around a pickup and/or drop-off location associated with the user's trip. In some aspects, sensor data may be associated with a business entity or activity that is inferred to be associated with a given location. Further to the above example, sensor data may be associated with a coffee shop (e.g. business 106) where user is known to have been prior to AV pick-up.

In block 406, sensor data is analyzed to perform sentiment analysis. As discussed above, processing to perform sentiment analysis can be performed locally e.g., on a computing system of the AV, or remotely, e.g., using one or more systems communicatively coupled to the AV, for example, via a wireless communication channel.

In block 408, one or more subsequent rides are taken by the user, e.g., to a repeat destination. Subsequently, historic sentiment scores can be referenced, for example, based on origin and/or destination information corresponding with the subsequent ride (block 410). In some aspects, destination recommendations can be provided to the user based on the origin/destination of the trip and associated sentiment scores (block 412). As discussed above, sentiment scores may also be used to alter ambience characteristics (e.g., in-cabin lighting, music and/or temperature). Further to the above examples, historic and/or real-time sentiment scores relating to the user can be used to select driving styles, for example, that are configured to match the user's mood, or to improve a user's emotional state.

Figure 5:
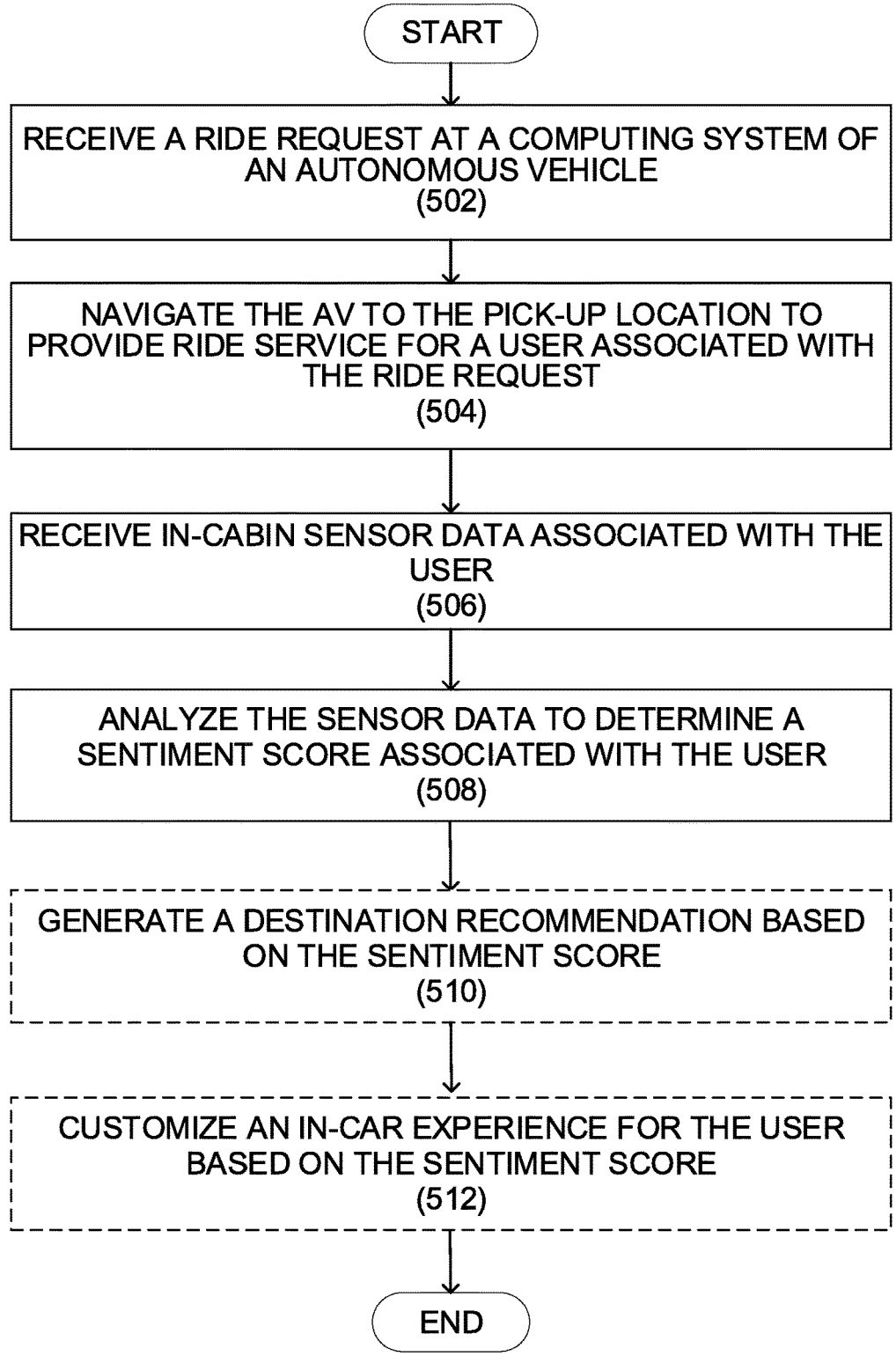
FIG. 5 illustrates an example process for generating destination recommendations and/or customizing an in-car experience for a rider/user, according to some aspects of the disclosed technology.

FIG. 5 illustrates an example process 500 for generating destination recommendations and/or customizing an in-car experience for a rider/user. Process 500 begins with step 502 in which a ride request is received, e.g., at a computing system of an autonomous vehicle (AV). In some aspects, the ride request is relayed from a client device of the requesting rider, via a dispatch system, and to the AV computing system. The ride request includes information specifying an origin (pick-up) location associated with requesting rider. In some aspects, the rider/user may be identified by his/her rider account, for example, that is associated with a unique identifier (user ID) specified in the request.

In step 504, the ride request causes the receiving AV to navigate to the specified pick-up location. Driving and routing/navigation functions can be performed by one or more local AV systems and/or remote systems accessible over a network in wireless communication with the AV. Upon arriving at the pick-up location, an identity of the rider is authenticated, and he/she is admitted into the interior (in-cabin) environment of the AV.

In step 506, sensor data is received or collected, at the AV, from the rider/user. As discussed above, sensor data can include audio and/or video data collected using one or more video cameras and/or microphones. Additionally, sensor data can include biometric data collected using one or more in-cabin biometric sensors. By way of example, a 3D point cloud measuring representations of rider facial features may be collected. Depending on the preferred implementations, the sensor data can be stored on a storage device local to the AV, and/or transmitted to one or more remote systems or services for remote storage and processing. Further to the examples provided with respect to example system 300, sensor data can be transmitted from the AV to customer experience platform 302 and stored in a rider profile database (e.g., profile database 308).

Subsequently, in step 508, the sensor data can be processed to generate a sentiment score associated with the rider. As discussed above, the sentiment score can provide a probabilistic score of a particular emotional affect associated with the user/rider at the time of sensor data collection. In remote processing implementations, the sensor data can be processed using one or more remote systems and/or services, such as sentiment analysis module 304, discussed above. Alternatively, all (or portions) of the sentiment processing functions may be performed locally, such as using one or more computing systems physically residing on the AV.

In optional step 510, the sentiment score can be used to provide a destination recommendation to the user. As discussed above, destination recommendations can also be based on other information that is known about the user, such as historic ride and sentiment data stored in a user profile, and/or other data about the user, for example, that is provided by one or more third-party systems or databases.

By way of example, user preferences may be gleaned from reviews for a business at a particular location that were created by the user. Based on inferences made about the user's preferences, as well as data collected about past and current sentiment scores, destination recommendations can be provided to the user. Destination recommendations may include drop-off suggestions, or way-points that are intended to improve an emotional state of the user. In some aspects, destination recommendations can be based on other third-party data, such as data indicating hours of operations or wait times, etc. For example, a favorite location of the user may not be provided as a recommended destination if it is known to be closed, or if the wait time is known to be particularly long. Virtually any information regarding the user, other users, and/or destinations of potential interest may be used to inform the destination recommendation, without departing from the scope of the disclosed technology.

In some aspects, the AV can determine whether or not to navigate to the recommended destination based on a measure of the emotional response by the user. For example, if a destination recommendation is followed by a user response that is determined to have a positive emotional tonality (as determined by sentiment score), then the AV may navigate to the recommended destination. Alternatively, if the destination recommendation is followed by a user response that is determined to have a negative emotional tonality, the destination recommendation may be ignored or invalidated. In such instances, the AV may offer a new destination recommendation, or may simply navigate to the originally intended drop-off point, depending on the desired implementation.

In optional step 512, an in-car experience for the user is customized based on the sentiment score. Customization of the user's in-car experience can include the automatic adjustment of one or more environmental parameters (e.g., temperature or light settings) of the in-cabin environment. Additionally, customization of the in-car experience may include the automatic selection of music (e.g., a musical genre or playlist). Similar to the generation of destination recommendations, customization of the in-car experience can be based on data that is considered in conjunction with the sentiment score, such as, historic preference information associated with the user, or other similar riders of the AV ride service.

Figure 6:
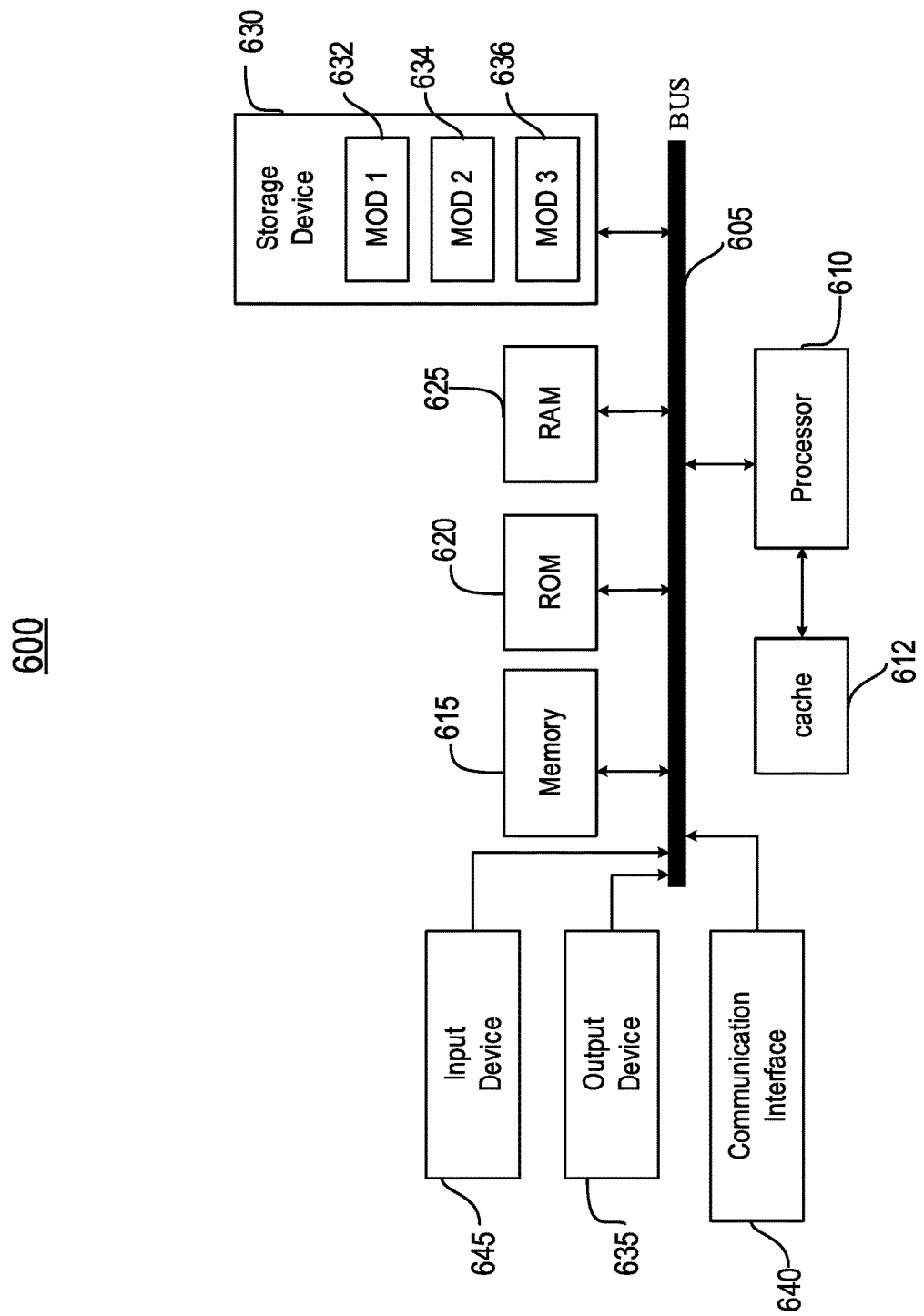
FIG. 6 illustrates an example processor-based system with which some aspects of the disclosed technology can be implemented.

FIG. 6 illustrates an example processor-based system with which some aspects of the subject technology can be implemented. Specifically, FIG. 6 illustrates system architecture 600 wherein the components of the system are in electrical communication with each other using a bus 605. System architecture 600 can include a processing unit (CPU or processor) 610, as well as a cache 612, that are variously coupled to system bus 605. Bus 605 connects various system components including a non-transitory computer-readable system memory 615, (e.g., read only memory (ROM) 620 and random-access memory (RAM) 525, to processor 610.

System architecture 600 can include a cache of high-speed memory connected directly with, in close proximity to, or integrated as part of the processor 610. System architecture 600 can copy data from the memory 615 and/or the storage device 630 to the cache 612 for quick access by the processor 610. In this way, the cache can provide a performance boost that avoids processor 610 delays while waiting for data. These and other modules can control or be configured to control the processor 610 to perform various actions. Other system memory 615 may be available for use as well. Memory 615 can include multiple different types of memory with different performance characteristics. Processor 610 can include any general purpose processor and a hardware module or software module, such as module 1 (632), module 2 (634), and module 3 (636) stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction with the computing system architecture 600, an input device 645 can represent any number of input mechanisms, such as a microphone for speech, a touch-sensitive screen for gesture or graphical input, keyboard, mouse, motion input, speech and so forth. An output device 635 can also be one or more of a number of output mechanisms. In some instances, multimodal systems can enable a user to provide multiple types of input to communicate with the computing system architecture 600. Communications interface 640 can generally govern and manage the user input and system output. There is no restriction on operating on any particular hardware arrangement and therefore the basic features here may easily be substituted for improved hardware or firmware arrangements as they are developed.

Storage device 630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 625, read only memory (ROM) 620, and hybrids thereof.

Storage device 630 can include software modules 632, 634, 636, for controlling processor 610. Other hardware or software modules are contemplated. Storage device 630 can be connected to the system bus 605. In one aspect, a hardware module that performs a particular function can include the software component stored in a computer-readable medium in connection with the necessary hardware components, such as the processor 610, bus 605, output device 635, and so forth, to carry out various functions of the disclosed technology.

By way of example, instruction stored on computer-readable media can be configured to cause one or more processors to perform operations including: receiving a ride request, at a computing system of an autonomous vehicle (AV), wherein the ride request comprises trip information that specifies a pick-up location associated with a user, navigating the AV to the pick-up location to provide ride service for the user, receiving in-cabin sensor data associated with the user, analyzing the in-cabin sensor data to determine a sentiment score associated with the user, generating a destination recommendation based on the trip information and the sentiment score associated with the user.

In some aspects, the one or more processors can be configured for performing additional steps including: customizing an in-car experience for the user based on one or more of: the trip information, the sentiment score associated with the user, or rider profile information associated with the user. In some aspects, generating the destination recommendation is further based on rider profile information associated with the user. In some aspects, the in-cabin sensor data includes camera footage received from one or more cameras disposed in a cabin of the autonomous vehicle. In some aspects, the in-cabin sensor data includes audio data received from microphones disposed in a cabin of the autonomous vehicle. In some aspects, the destination recommendation is formulated to improve the sentiment score associated with the user. In some aspects, the destination recommendation is formulated to include a waypoint en route to a drop-off location specified by the user.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

What is claimed is:

1. A computer-implemented method comprising:
    collecting sensor data from a sensor of an autonomous vehicle at a location, wherein the sensor data captures a passenger;
    analyzing the sensor data to determine a sentiment of the passenger;
    generating an association between the location and the sentiment of the passenger;
    producing, based on the association, a sentiment score for the passenger;
    changing a parameter that controls adjustment of the in-cabin environment of the autonomous vehicle based on the sentiment score;
    formulating a recommendation for a destination based on a historical sentiment score associated with the passenger and the destination;
    determining that a response to the recommendation is associated with an updated sentiment score indicative of a negative emotional tonality; and
    generating a second recommendation for a second destination based on the response and a historical sentiment score associated with the passenger and the second destination.

2. The computer-implemented method of claim 1, further comprising:
    storing the sentiment score as part of the historical sentiment score, wherein the historical sentiment score is used to change a parameter of a subsequent ride.

3. The computer-implemented method of claim 1, further comprising:
    making a probabilistic determination that the passenger is having a particular emotion based on the sentiment score.

4. The computer-implemented method of claim 1, wherein the sentiment score is one of a plurality of sentiment scores, and wherein each sentiment score of the plurality of sentiment scores represents a likelihood that the passenger is experiencing a corresponding emotion.

5. The computer-implemented method of claim 1, wherein the parameter is a driving style for the autonomous vehicle.

6. A system comprising:
    a processor; and
    a memory storing computer-readable instructions, which when executed, are effective to cause the processor to:
        collect sensor data from a sensor of an autonomous vehicle at a location, wherein the sensor data captures a passenger;
        analyze the sensor data to determine a sentiment of the passenger;
        generate an association between the location and the sentiment of the passenger;
        produce, based on the association, a sentiment score for the passenger;
        change a parameter that controls adjustment of the in-cabin environment of the autonomous vehicle based on the sentiment score;
        formulate a recommendation for a destination based on a historical sentiment score associated with the passenger and the destination;
        determine that a response to the recommendation is associated with an updated sentiment score indicative of a negative emotional tonality; and
        generate a second recommendation for a second destination based on the response and a historical sentiment score associated with the passenger and the second destination.

7. The system of claim 6, wherein the computer-readable instructions, when executed, are further effective to cause the processor to:
    store the sentiment score as part of the historical sentiment score, wherein the historical sentiment score is used to change a parameter of a subsequent ride.

8. The system of claim 6, wherein the computer-readable instructions, when executed, are further effective to cause the processor to:

make a probabilistic determination that the passenger is having a particular emotion based on the sentiment score.

9. The system of claim 6, wherein the sentiment score is one of a plurality of sentiment scores, and wherein each sentiment score of the plurality of sentiment scores represents a likelihood that the passenger is experiencing a corresponding emotion.

10. The system of claim 6, wherein the parameter is a driving style for the autonomous vehicle.

11. A non-transitory computer-readable medium comprising instructions stored thereon, which when executed by one or more processors, cause the one or more processors to perform operations comprising:
  collect sensor data from a sensor of an autonomous vehicle at a location, wherein the sensor data captures a passenger;
  analyze the sensor data to determine a sentiment of the passenger;
  generate an association between the location and the sentiment of the passenger;
  produce, based on the association, a sentiment score for the passenger;
  changing a parameter that controls adjustment of the in-cabin environment of the autonomous vehicle based on the sentiment score;
  formulate a recommendation for a destination based on a historical sentiment score associated with the passenger and the destination;
  determine that a response to the recommendation is associated with an updated sentiment score indicative of a negative emotional tonality; and
  generate a second recommendation for a second destination based on the response and a historical sentiment score associated with the passenger and the second destination.

12. The non-transitory computer-readable medium of claim 11, wherein the instructions, when executed by the one or more processors, further cause the one or more processors to:
  store the sentiment score as part of the historical sentiment score, wherein the historical sentiment score is used to change a parameter of a subsequent ride.

13. The non-transitory computer-readable medium of claim 11, wherein the instructions, when executed by the one or more processors, further cause the one or more processors to:
  make a probabilistic determination that the passenger is having a particular emotion based on the sentiment score.

14. The non-transitory computer-readable medium of claim 11, wherein the sentiment score is one of a plurality of sentiment scores, and wherein each sentiment score of the plurality of sentiment scores represents a likelihood that the passenger is experiencing a corresponding emotion.

\* \* \* \* \*